United States Patent [19]
Naumann

[11] 3,863,424
[45] Feb. 4, 1975

[54] BLOWING AND FILLING MACHINE FOR THE CONTINUOUS PRODUCTION OF FILLED AND SEALED CONTAINERS, PARTICULARLY INFUSION BOTTLES

[75] Inventor: Wilhelm Naumann, Ettlingen, Baden, Germany

[73] Assignee: PMD Entwicklungswerk fur Kunststoff-Maschinen GmbH & Co., K.G., Ettlingern, Germany

[22] Filed: May 23, 1973

[21] Appl. No.: 363,129

[30] Foreign Application Priority Data
May 25, 1972 Germany.............................. 2225311

[52] U.S. Cl................... 53/192, 53/140, 425/326 B
[51] Int. Cl........................... B65b 3/02, B65b 47/08
[58] Field of Search ............ 53/191, 192, 193, 134, 53/372, 140, 194; 425/242 B, 326 B

[56] References Cited
UNITED STATES PATENTS

| | | | |
|---|---|---|---|
| 3,052,916 | 9/1962 | Campbell..................... | 425/326 B X |
| 3,311,949 | 4/1967 | Moran ................... | 53/191 |
| 3,325,862 | 6/1967 | Mehnert ................... | 53/192 |
| 3,357,046 | 12/1967 | Pechthold ..................... | 53/191 X |
| 3,464,085 | 9/1969 | Burkett et al..................... | 53/140 X |
| 3,523,329 | 8/1970 | Gallay..................... | 53/191 |
| 3,635,635 | 1/1972 | Moslo............................. | 425/326 B |
| 3,685,943 | 8/1972 | Fischer............................ | 425/326 B |
| 3,732,661 | 5/1973 | Goldberger et al.................. | 53/134 |
| 3,785,116 | 1/1974 | Munz et al......................... | 53/140 X |

Primary Examiner—Travis S. McGehee
Assistant Examiner—Horace M. Culver
Attorney, Agent, or Firm—Ernest G. Montague; Karl F. Ross; Herbert Dubno

[57] ABSTRACT

A blowing and filling machine for the continuous manufacture of filled and sealed containers, particularly infusion bottles, which comprises devices for introduction and expanding a section of tubing of deformable synthetic material and for filling and closing shaped containers within a divisible blow mold movable into open and closed positions and for transporting the containers. The blow mold has at least one mold cavity including an opening facing a filling device and adjusted to the bottom of the container. The blow mold has additionally a closure device sealing the bottom of the container and including at least two welding and cutting jaws having facing work surfaces capable of being pressed against each other. The facing working surfaces of the jaws contain, in addition to welding edges, also cutting edges and counter cutting edges, shaping the bottom and separating the latter from the residue.

2 Claims, 3 Drawing Figures

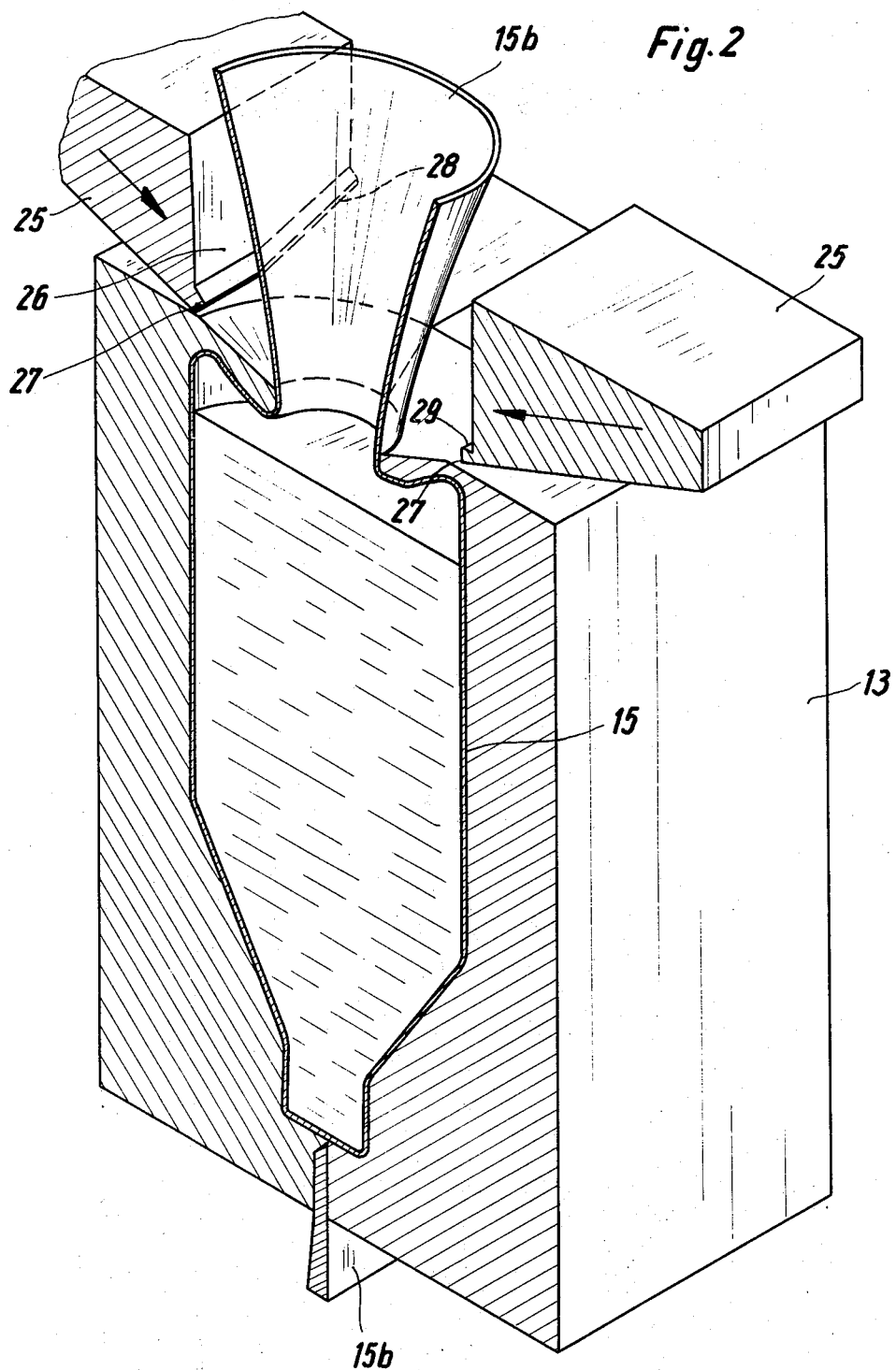

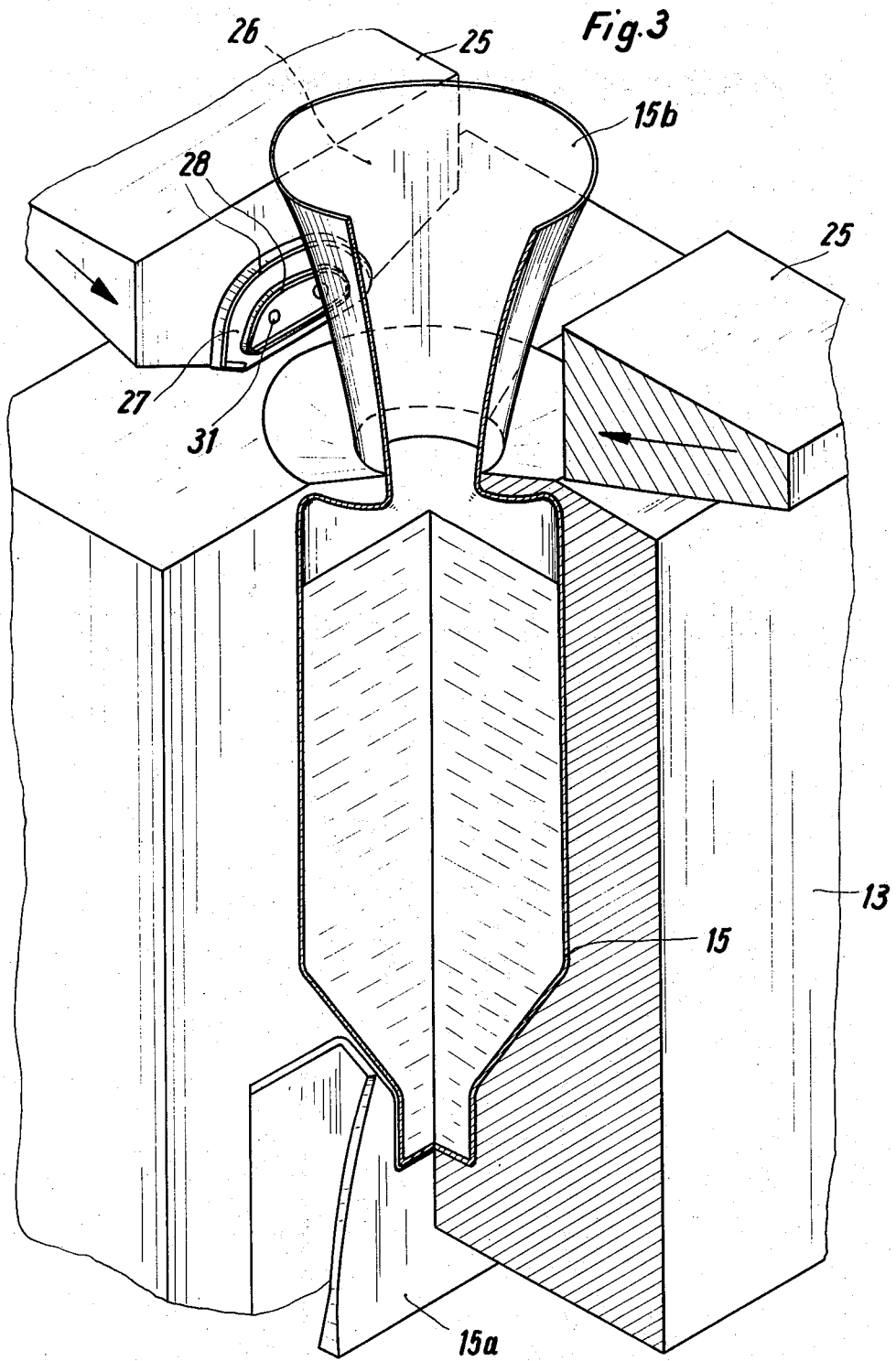

BLOWING AND FILLING MACHINE FOR THE CONTINUOUS PRODUCTION OF FILLED AND SEALED CONTAINERS, PARTICULARLY INFUSION BOTTLES

The present invention relates to a blowing and filling machine for the continuous production of filled and sealed containers, particularly infusion bottles, having devices for introducing and expanding a length of tube of deformable synthetic material and filling and sealing the shaped container within a split blow mold which is movable open and into closed positions, and for transporting the containers out of the machine.

For the production of a container shaped from synthetic material in a blow-molding process or else in a vacuum process and in which the container is also filled and sealed, it is necessary that, after the filling process, the container material which surrounds the filing opening be pressed firmly to provide a tight seal or weld as a result of the heat which it retains. It is also necessary to remove the container the waste material protruding beyond the seal; this operation is frequently difficult, particularly in the case of bottles of relatively small volume, such as infusion bottles.

It is already known to feed the filled and sealed containers and bottles of synthetic material, respectively, after their release from the mold to special devices having moving tools, by which the waste is removed by striking, turning or tearing. These devices are expensive and do not operate with sufficient reliability, for instance, because the scrap (waste) is not properly grasped or the material is not yet sufficiently cold and hard. Furthermore, these known devices cannot be employed, for instance, for infusion bottles with a suspension eye formed on their bottom, since the suspension eye cannot be cleanly freed of scrap by this method.

It is one object of the present invention therefore to provide an apparatus by means of which the scrap can be removed reliably, even from small containers or bottles.

According to the present invention the blow mold has at least one mold cavity with an opening which faces the filling device and is adapted to the bottom of the container, and a closing device which seals the bottom of the container and has at least two compressible sealing or welding and cutting jaws, the juxtaposed working surfaces of which contain, in addition to sealing (welding) edges, also cutting edges and cutting counter-edges which shape and/or cut off the excess tubing on the bottom side.

In this way the result is obtained, that due to the filling and closing at the bottom, it is possible, even in the case of small bottles, to use relatively large bottom-closing devices, the working surfaces of which are adapted to receive welding and cutting edges alongside each other. The waste or scrap is therefore removed without any special expenditure for apparatus during the closing movement of the sealing jaws closely alongside the weld by a reliable cut. Furthermore, it is possible to provide, alongside the above-described sealing (welding) and cutting edges additional welding and cutting edges, which shape the excess tubing, for instance, into a suspension eye, said edges being adapted cleanly to remove the scrap portions present alongside and within the suspension eye.

These and other objects will become more readily apparent from the following detailed description of the present invention, reference being made to the accompanying drawing, in which:

FIG. 2 is a perspective view of a blow mold with a filled container and welding and cutting jaws in accordance with a first embodiment, shown in section in a larger scale than in FIG. 1; and FIG. 3 is a perspective view similar to that of FIG. 2, with welding and cutting jaws in accordance with a second embodiment.

Figure 1:
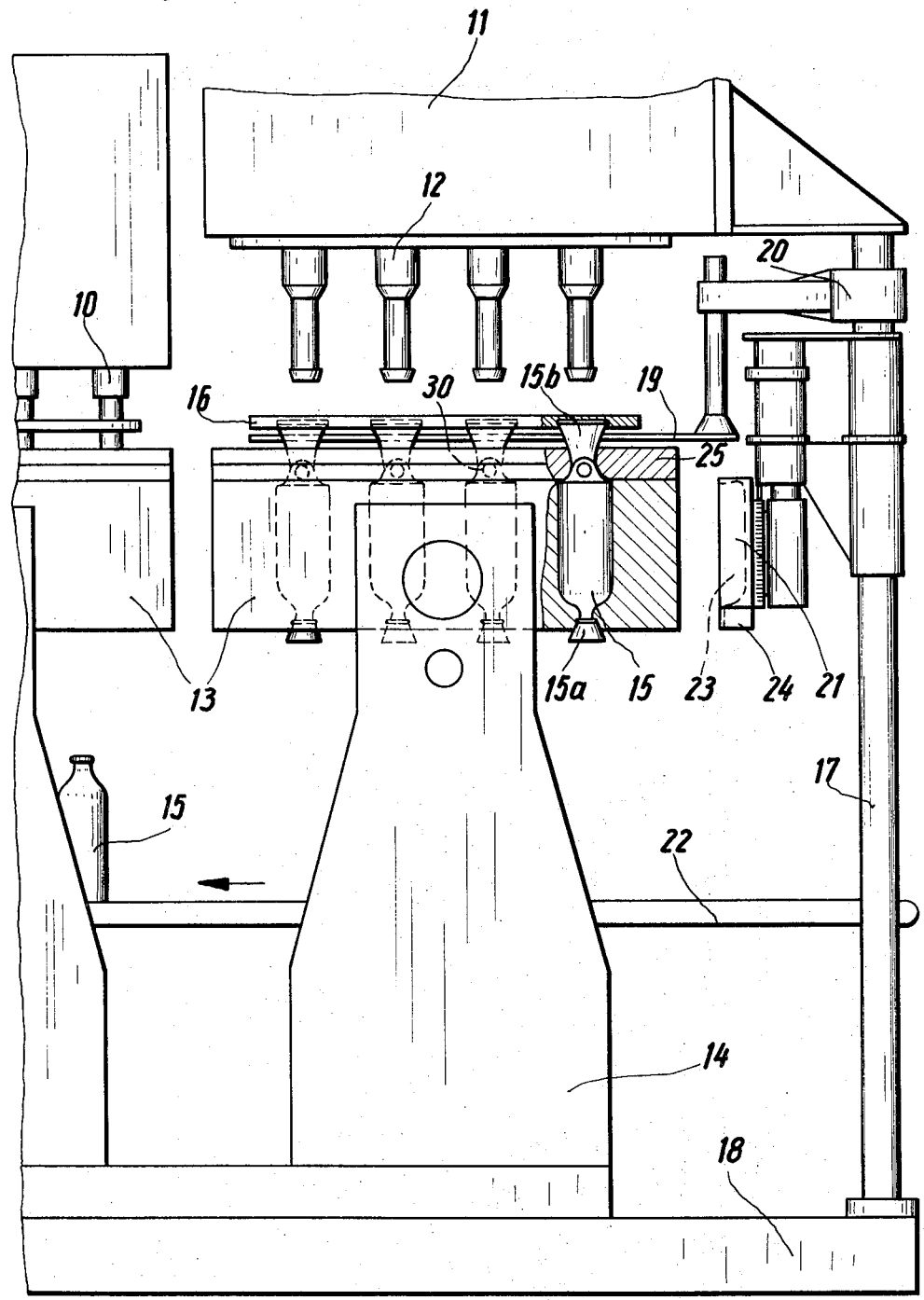
FIG. 1 is a fragmentary elevation of a blowing and filling machine at a filling station, partially in section.

The blowing and filling machine of FIG. 1 (only the parts essential here being shown in the drawing) contains an extruder (not shown) having four tube extrusion nozzles 10 combined into a unit. Alongside of the extrusion station on the opposite side there are two blowing, filling and closing stations 11, only half of one station being shown in FIG. 1 of the drawings for the sake of simplicity. Each of these blowing-filling-sealing stations has four blowing and filling mandrels 12 which are combined together to form a unit in a blow head and are subject to simultaneous operation.

Below the extrusion nozzles 10 and the blowing and filling mandrels 12, two blow molds 13 are movable back and forth on a carriage 14 between the stations. Both blow molds have four mold recesses and are furthermore equipped in the same way. Their distance apart is such, that during the period of time in which one blow mold is stationed beneath the extrusion nozzles to receive four tube lengths of a hot, deformable synthetic material, the second blow mold is under the blowing-and-filling-mandrels of the one station and their sections of tubing contained therein are shaped into containers 15, filled and hermetically closed. For these processes the blow molds contain known auxiliary devices, of which, in order not to clutter the drawing, only a tube holder 16 is shown, which extends horizontally over the blow mold and grasps all four sections of tube at their upper edge.

Alongside the blowing-and-filling stations 11 there are arranged alongside each other on the outside of the machine in each case two vertical guide bars 17 which extend from the machine base 18 to the blow head. Below the blowing-and-filling mandrels there is a clamping device 19 with two clamping strips which are movable in plier-like manner into open or closed position and which have their bearing pieces 20 supported on the guide bars 17.

Upon the movement of the blow mold into the blowing-and-filling-station, the clamping strips of the clamping device come to rest above the blow mold under the tube holder and extend over all four tube sections.

Below this clamping device 19 and 20 there are seated on the guide bars 17 two holding segments 21 which can be swung together in the manner of a book and which are movable via known drive elements (not shown) both in a horizontal plane into an open or closed position and in vertical direction into an above-mentioned upper position below the clamping device or a lower position above a conveyor belt 22 which removes the filled containers. The holding segments have four receiving chambers 23, which are substantially adapted to the shape of the container, but which surround only the body of the containers and allow both the head-side and bottom-side container sections and scrap parts, respectively, to protrude freely. In the region of the head-side lower scrap parts 15a (FIG. 1) of the tube sections there are seated below the holding segments bipartite tools 24 which separate the scrap parts from the container head. For this purpose there are fastened below the one holding segment four cutting elements adjusted to the shape of the container head and have secured below the second segment four opposing cutting elements, which come against each other when the holding segments are swung closed and cut off the scrap parts.

The bottom-side scrap parts 15b (at the top of the drawing) of the containers are separated during the welding (heat sealing) process for the closing of the container bottoms from the closure elements. For this purpose two welding and cutting jaws 25, which can be moved towards each other and pressed firmly against each other are provided on the blow mold 13 in the region of the upper end section of the plastic tubes which still have their own heat. The facing working surfaces 26 of said jaws 25, shown in FIGS. 2 and 3, are provided, in addition to the welding edges 27 which are movable in known manner towards each other so as to leave a narrow gap which is adapted to the thickness of the plastic, also cutting edges 28 which, at the end of the closing movement, are pressed firmly against cutting counter edges 29 and separate the tube scrap from the container.

In the first embodiment shown in FIG. 2, the welding edges as well as the cutting edges and their counter edges have been developed with only a slight arch adapted merely to the concave shape of the bottom of the container. In this connection the bottom-side scrap 15b is separated from the container except for a thin web by means of the welding and cutting jaws 25. After the opening and removal of the blow mold 13, the clamping device holds the containers fast at the scrap parts 15b, until the holding segments 21 have been swung inwards and closed. Upon the downward travel of these closed holding segments, the scrap parts still held fast by the clamping device are finally torn off. Thereupon the holding segments are turned around their horizontal axis and the containers placed, resting with their bottom, on the removal conveyor belt 22. The holding segments thereupon open into a spread position and move back into the upper position.

In the second embodiment, shown in FIG. 3, in order to produce infusion bottles which can be hung up, the welding edges 27 are developed as surfaces extending in the form of eyes, said surfaces being defined towards the outside and therefore away from the container and in the center by the cutting edges 28 of the one welding and cutting jaw 25 and the not shown counter cutting edges of the second welding and cutting jaw 25. In this way, after the filling of the container 15, upon the moving together of the welding and cutting jaws 25, a part of the tube scrap 15b is developed into a suspension eye 30 formed on the container bottom (FIG. 1), which eye simultaneously has the inside of its circle as well as the outer edge cut free of scrap plastic. Parts of scrap which remain adhering to the welding and cutting jaws are expelled after the opening of the jaws by ejection pins 31 which are briefly operated. A suction device (not shown) removes the scrap parts from the working region.

The clamping device 19 grasps the containers at their suspension eyes 30 and holds the containers only until the blow mold has been moved away open and the holding segments 21 have closed around the containers. The clamping device now opens, whereupon the closed holding segments move down, turn and place the containers standing on their bottom on the conveyor belt 22. The suspension eyes in this connection, due to a scoring groove on one side which is right next to the bottom wall, bend into the space within the concave bottom curvature of the container.

I claim:

1. An apparatus for the production of filled infusion bottles comprising:
    a suspension station adapted to extrude at least one tube of synthetic-resin material;
    a blowing, filling and sealing station spaced from said extrusion station and provided with a blowing mandrel receivable in a tube extruded at said extrusion station for blowing same and for filling the blown tube;
    a blowing mold shiftable between said stations for receiving said tube and retaining same during the blowing and filling thereof, said blowing mold comprising a pair of separable mold parts defining at least one cavity having the configuration of an infusion bottle, said cavity being formed with a downwardly convex upward wall portion surrounding an opening adapted to receive said mandrel and conforming to the concave bottom of an infusion bottle adapted to be formed in said cavity, said mold parts being further provided with cutting and sealing edges at a bottom portion for sealing the top of an infusion bottle adapted to be formed in the mold cavity;
    a pair of clamping members engageable with a portion of said tube projecting from said opening and formed with first sealing edges conforming to the concavity of the bottom of said bottle for sealing said bottom, and annular sealing and cutting edges for defining a flat eye extending from said bottom and formed with a hole enabling the hanging of said bottle from the synthetic-resin material extending through said opening;
    means for displacing said members into and out of engagement with the synthetic-resin material extending through said opening; and
    means for removing the filled bottles from said mold and transporting them away.

2. The apparatus defined in claim 1 wherein the last-mentioned means includes a conveyor belt and means for inverting the bottles removed from said mold and placing them upon said conveyor belt in an upright position.

* * * * *